US012494357B2

(12) United States Patent
Covey et al.

(10) Patent No.: US 12,494,357 B2
(45) **Date of Patent: *Dec. 9, 2025**

(54) METHOD FOR INCREASED THROUGHPUT

(71) Applicant: DH TECHNOLOGIES DEVELOPMENT PTE. LTD., Singapore (SG)

(72) Inventors: Thomas R Covey, Newmarket (CA); Gordana Ivosev, Etobicoke (CA); Peter Kovarik, Markham (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 387 days.

This patent is subject to a terminal disclaimer.

(21) Appl. No.: 17/999,641

(22) PCT Filed: May 21, 2021

(86) PCT No.: PCT/IB2021/054400

§ 371 (c)(1),
(2) Date: Nov. 22, 2022

(87) PCT Pub. No.: WO2021/234643

PCT Pub. Date: Nov. 25, 2021

(65) Prior Publication Data

US 2023/0207299 A1 Jun. 29, 2023

Related U.S. Application Data

(60) Provisional application No. 63/029,257, filed on May 22, 2020.

(51) Int. Cl.

*H01J 49/04* (2006.01)
*H01J 49/00* (2006.01)

(52) U.S. Cl.

CPC ...... *H01J 49/0454* (2013.01); *H01J 49/0036* (2013.01); *H01J 49/0418* (2013.01)

(58) Field of Classification Search

CPC ............... H01J 49/0454; H01J 49/0009; H01J 49/0027; H01J 49/0404

See application file for complete search history.

(56) References Cited

U.S. PATENT DOCUMENTS

| | | | |
|---|---|---|---|
| 7,923,681 | B2 | 4/2011 | Collings |
| 2011/0202287 | A1 | 8/2011 | Ivosev |

(Continued)

OTHER PUBLICATIONS

International Search Report and Written Opinion for PCT/IB2021/054400, mailed Sep. 16, 2021.

(Continued)

*Primary Examiner* — Nicole M Ippolito
(74) *Attorney, Agent, or Firm* — Merchant & Gould P.C.

(57) ABSTRACT

A trace of intensity versus time values is received for a series of samples produced by a mass spectrometer. Also, a series of ejections times corresponding to the series of samples produced by a sample introduction system is received. A series of expected peak times corresponding to the series of ejection times are calculated using a known delay time from ejection to mass analysis. At least one isolated peak of the trace is identified using the series of expected peak times. A peak profile is calculated by fitting a mixture of at least two different distribution functions to the at least one isolated peak. For at least one time of the series of expected peak times, an area of a peak at the one time is calculated by fitting the peak profile to the trace at the one time and calculating an area of the fitted peak profile.

15 Claims, 11 Drawing Sheets

(56) References Cited

U.S. PATENT DOCUMENTS

| | | | | |
|---|---|---|---|---|
| 2012/0246211 A1 | 9/2012 | Lytle | | |
| 2019/0157060 A1 | 5/2019 | Datwani | | |
| 2019/0157061 A1 | 5/2019 | Datwani et al. | | |
| 2023/0207298 A1 * | 6/2023 | Liu | H01J 49/0454 | 250/281 |
| 2023/0238232 A1 * | 7/2023 | Cox | H01J 49/0009 | 250/288 |

OTHER PUBLICATIONS

Wei et al. "Data Dependent Peak Model Based Spectrum Deconvolution for Analysis of High Resolution LC-MS Data" Analytical Chemistry, vol. 86, No. 4, Feb. 18, 2014, pp. 2156-2165, XP055828499.
Hager, James et al., "Product ion scanning using a Q-q-Q linear ion trap (Q TRAP) mass spectrometer", in Rapid Communications in Mass Spectrometer, 2003; 17: 1056-1064.
PCT International Preliminary Report on Patentability in Application PCT/IB2021/054400, mailed Dec. 1, 2022, 9 pages.

* cited by examiner

900

METHOD FOR INCREASED THROUGHPUT

RELATED US APPLICATION

This application is a National Stage Application of PCT/IB2021/054400, filed May 21, 2021, which claims the benefit of U.S. Provisional Application No. 63/029,257, filed on May 22, 2020, the entire disclosures of which are incorporated herein by reference in their entireties. To the extent appropriate, a claim of priority is made to each of the above disclosed applications.

INTRODUCTION

The teachings herein relate to operating a sample introduction system and a mass spectrometer to mass analyze a series of samples. More specifically, systems and methods are provided to calculate the area of peaks (such as mass peaks) produced for a series of samples using ejections times recorded by the sample introduction system.

High-Throughput Sample Analysis Problem

High-throughput sample analysis is critical to the drug discovery process. Bioanalysis technologies include colorimetric microplate-based readers. Such readers, however, are often constrained by linear dynamic range as well as the need for label attachment schemes which have the propensity to modify equilibrium and kinetic analysis.

Mass spectrometry (MS) based methods can achieve label-free, universal mass detection of a wide range of analytes with exceptional sensitivity, selectivity, and specificity. Recently, there has been a lot of activity in improving the throughput of MS-based analysis for drug discovery. In particular, a number of sample introduction systems for MS-based analysis have been improved to provide higher throughput. These sample introduction systems include, but are not limited to, solid-phase extraction systems, such as RAPIDFIRE®, surface analysis systems, such as matrix-assisted laser desorption/ionization (MALI) and laser diode thermal desorption (LDTD), and flow injection systems, such as certain types of acoustic ejection mass spectrometry systems.

For some of these technologies, the analytical throughput is limited by the speed of the sample introduction. This is the case for the RAPIDFIRE® system, for example.

For other technologies, the sample is delivered to the mass spectrometer quite fast (multiple samples per second). The limiting factor for the throughput, however, is the peak width of an individual sample in the time domain. More specifically, the limiting factor is the ability of the data processing algorithm to accurately integrate the area of a peak when signals from adjacent signals are partially overlapped.

Calculating or integrating the peak area of certain types of acoustic ejection mass spectrometry peaks is especially challenging when the assay requires a wide concentration dynamic range. In other words, peak integration is especially difficult when a peak of lower intensity immediately follows a peak of much higher signal intensity (e.g., 1000 times higher). Essentially, the lower intensity peak becomes part of or is convolved with the higher intensity peak.

One solution to this problem is to prevent any interference between peaks. This is accomplished by increasing the delay time between sample injections. Unfortunately, this solution decreases the overall sample throughput of such systems.

As a result, in order to maintain or increase the throughput of certain types of acoustic ejection mass spectrometry systems, it is preferable to integrate the convolved peaks.

Conventionally, many algorithms are available to integrate interfering chromatographic peaks.

Unfortunately, peaks generated from such systems do not have the same shape as chromatographic peaks. In comparison to chromatographic peaks, the expected peaks are asymmetric. They generally have a strong leading edge and a long trailing edge. In addition, in comparison to chromatographic peaks, both the leading and trailing edges of certain types of acoustic ejection mass spectrometry peaks have steeper gradients. Consequently, the algorithms used to integrate convolved chromatographic peaks cannot be used to integrate these peaks.

As a result, additional systems and methods are needed to calculate or integrate the area of one or more these types of peaks.

ADE and OPI Background

Accurate determination of the presence, identity, concentration, and/or quantity of an analyte in a sample is critically important in many fields. Many techniques used in such analyses involve ionization of species in a fluid sample prior to introduction into the analytical equipment employed. The choice of ionization method will depend on the nature of the sample and the analytical technique used, and many ionization methods are available. Mass spectrometry is a well-established analytical technique in which sample molecules are ionized and the resulting ions are then sorted by mass-to-charge ratio.

The ability to couple mass spectrometric analysis, particularly electrospray mass spectrometric analysis, to separation techniques, such as liquid chromatography (LC), including high-performance liquid chromatography (HPLC), capillary electrophoresis, or capillary electrochromatography, has meant that complex mixtures can be separated and characterized in a single process. Improvements in HPLC system design, such as reductions in dead volumes and an increase in pumping pressure, have enabled the benefits of smaller columns containing smaller particles, improved separation, and faster run time to be realized. Despite these improvements, the time required for sample separation is still around one minute. Even if real separation is not required, the mechanics of loading samples into the mass spectrometer still limit sample loading time to about ten seconds per sample using conventional autosamplers with some level of cleanup between injections.

There has been some success in improving throughput performance. Simplifying sample processing by using solid-phase extraction, rather than traditional chromatography, to remove salts can reduce pre-injection times to under ten seconds per sample from the minutes per sample required for HPLC. However, the increase in sampling speed comes at the cost of selectivity or sensitivity. Furthermore, the time saved by the increase in sampling speed is offset by the need for cleanup between samples.

Another limitation of current mass spectrometer loading processes is the problem of carryover between samples, which necessitates a cleaning step after each sample is loaded to avoid contamination of a subsequent sample with a residual amount of analyte in the prior sample. This requires time and adds a step to the process, complicating rather than streamlining the analysis with conventional autosampler systems.

Additional limitations of current mass spectrometers when used to process complex samples, such as biological fluids, are unwanted "matrix effects," phenomena that result from the presence of matrix components (e.g., natural matrix components such as cellular matrix components, or contaminants inherent in some materials such as plastics) and adversely affect detection capability, precision, and/or accuracy for the analyte of interest.

A system was developed combining ADE with an open port interface (OPI) for high-throughput mass spectrometry. This system is described in U.S. patent application Ser. No. 16/198,667 (hereinafter the "'667 Application"), which is incorporated herein in its entirety.

FIG. 1A is an exemplary system combining ADE with an OPI, as described in the '667 Application. In FIG. 1A, the ADE device is shown generally at 11, ejecting droplet 49 toward the continuous flow OPI indicated generally at 51 and into the sampling tip 53 thereof.

ADE device 11 includes at least one reservoir, with a first reservoir shown at 13 and an optional second reservoir 31. In some embodiments, a further plurality of reservoirs may be provided. Each reservoir is configured to house a fluid sample having a fluid surface, e.g., a first fluid sample 14 and a second fluid sample 16 having fluid surfaces respectively indicated at 17 and 19. The fluid samples 14 and 16 may be the same or different, but are generally different, insofar as they will ordinarily contain two different analytes intended to be transported to and detected in an analytical instrument (not shown). The analyte may be a biomolecule or a macromolecule other than a biomolecule, or it may be a small organic molecule, an inorganic compound, an ionized atom, or any moiety of any size, shape, or molecular structure, as explained earlier in this section. In addition, the analyte may be dissolved, suspended or dispersed in the liquid component of the fluid sample.

When more than one reservoir is used, as illustrated in FIG. 1A, the reservoirs are preferably both substantially identical and substantially acoustically indistinguishable, although identical construction is not a requirement. As explained earlier in this section, the reservoirs may be separate removable components in a tray, rack, or other such structure, but they may also be fixed within a plate, e.g., a well plate, or another substrate. Each reservoir is preferably substantially axially symmetric, as shown, having vertical walls 21 and 23 extending upward from circular reservoir bases 25 and 27, and terminating at openings 29 and 31, respectively, although other reservoir shapes and reservoir base shapes may be used. The material and thickness of each reservoir base should be such that acoustic radiation may be transmitted therethrough and into the fluid sample contained within each reservoir.

ADE device 11 comprises acoustic ejector 33, which includes acoustic radiation generator 35 and focusing means 37 (such as a lens) for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13. The system may contain a single acoustic ejector, as illustrated in FIG. 1A, or, as noted previously, it may contain multiple ejectors.

In operation, reservoir 13 and optional reservoir 15, in embodiments where multiple reservoirs are provided, of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53. While only reservoir 13 and optional reservoir 15 are depicted for clarity, any number of wells may be present and are contemplated. In some embodiments, the reservoir and optional reservoir are part of a conventional well plate holding a plurality of wells (for example, 96).

The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. A multi-well plate can include, but is not limited to, a 24 well, a 384 well, or a 1536 well plate.

Fluid samples 14 and 16 are samples of any fluid for which transfer to an analytical instrument is desired. Accordingly, the fluid sample may contain a solid that is minimally, partially or fully solvated, dispersed, or suspended in a liquid, which may be an aqueous liquid or a nonaqueous liquid. The structure of an embodiment of an OPI 51 is also shown in FIG. 1A. Other configurations of continuous flow OPIs can be used as is or in modified form, all of which, as is well known in the art, and operate according to substantially the same principles. As can be seen in FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13.

The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. An optional solvent pump (not shown) is operably connected to and in fluid communication with solvent inlet 57 in order to control the rate of solvent flow from a solvent supply through the solvent transport capillary to the sampling tip 53 and thus the rate of solvent flow within the solvent transport capillary 59 as well.

Fluid flow within the OPI 51 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to assist in controlling the output rate from outlet 63 as well as the aspiration of solvent at the sampling tip 53.

In one embodiment, a positive displacement pump is used as the solvent pump, e.g., a peristaltic pump, and, instead of a sampling pump, an aspirating nebulization system is used so that the analyte-solvent dilution is drawn out of the sample outlet 63 (the electrospray ion source outlet) by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67.

In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas. In various embodiments, sample outlet 63 is a straight pipe protruding out of a gas nozzle.

In the illustrated embodiment, the solvent transport capillary 59 and sample transport capillary 61 are provided by outer capillary tube 71 and inner capillary tube 73 substantially coaxially disposed therein, where the inner capillary tube 73 defines the sample transport capillary, and the annular space between the inner capillary tube 73 and outer capillary tube 71 defines the solvent transport capillary 59. Other configurations may also be utilized. The dimensions of the inner capillary tube 73 can be from 1 micron to 1 mm, e.g., 200 microns. Typical dimensions of the outer diameter of the inner capillary tube 73 can be from 100 microns to 3 or 4 centimeters, e.g., 360 microns. Typical dimensions of the inner diameter of the outer capillary tube 71 can be from 100 microns to 3 or 4 centimeters, e.g., 450 microns. Typical dimensions of an outer diameter of the outer capillary tube 71 can be from 150 microns to 3 or 4 centimeters, e.g., 950 microns. The cross-sectional areas of the inner capillary tube 73 and/or the outer capillary tube 71 can be circular, elliptical, superelliptical (i.e., shaped like a superellipse), or even polygonal. While the illustrated system in FIG. 1A indicates the direction of solvent flow as downward from the solvent inlet 57 toward sampling tip 53 in the solvent transport capillary 59 and the direction of the analyte-solvent dilution flow as upward from the sampling tip 53 upward through the sample transport capillary 61 toward outlet 63, the directions can be reversed, and the OPI 51 is not necessarily positioned to be exactly vertical. Various modifications to the structure shown in FIG. 1A will be apparent to those of ordinary skill in the art, or may be deduced by those of ordinary skill in the art during use of the system. For example, other embodiments, and different geometries and configurations of solvent transport capillaries and sample transport capillaries may be provided. For instance, the capillaries need not be co-axial and may have different cross-sections from those illustrated, provided they are suitable to supply solvent to an exposed sampling region and aspirate the supplied solvent and captured sample from the sampling region for analysis by sample analyzer.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the OPI 51, and the inner and outer capillary tubes 73, 71 can be arranged coaxially around a longitudinal axis of the OPI 51, as shown in FIG. 1.

Optionally, prior to use, the adjuster 75 is used to draw the inner capillary tube 73 longitudinally inward so that the outer capillary tube 71 protrudes beyond the end of the inner capillary tube 73, so as to facilitate optimal fluid communication between the solvent flow in the solvent transport capillary 59 and the sample transported as an analyte-solvent dilution flow 61 in the sample transport capillary 61. Additionally, as illustrated in FIG. 1A, the OPI 51 is generally affixed within an approximately cylindrical holder 81, for stability and ease of handling.

FIG. 1B is an exemplary embodiments of a system 110 for ionizing and mass analyzing analytes received within an open end of a sampling OPI, as described in the '667 Application. System 110 includes acoustic droplet ejection device 11 configured to eject a droplet 49 from a reservoir into the open end of sampling OPI 51. As shown in FIG. 1B, the exemplary system 110 generally includes a sampling OPI 51 in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling OPI 51 and from the sampling OPI 51 to the ion source 160. For example, as shown in FIG. 1B, the solvent reservoir 150 (e.g., containing a liquid, desorption solvent) can be fluidly coupled to the sampling OPI 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 51 occurs within a sample space accessible at the open end such that one or more droplets 49 can be introduced into the liquid boundary 50 at the sample tip and subsequently delivered to the ion source 160.

As shown, the system 110 includes an acoustic droplet ejection device 11 that is configured to generate acoustic energy that is applied to a liquid contained within a reservoir (as depicted in FIG. 1A) that causes one or more droplets 49 to be ejected from the reservoir into the open end of the sampling OPI 51. A controller 180 can be operatively coupled to the acoustic droplet ejection device 11 and can be configured to operate any aspect of the acoustic droplet ejection device 11 (e.g., focusing means, acoustic radiation generator, automation means for positioning one or more reservoirs into alignment with the acoustic radiation generator, etc.) so as to inject droplets into the sampling OPI 51 or otherwise discussed herein substantially continuously or for selected portions of an experimental protocol by way of non-limiting example. Controller 180 can be, but is not limited to, a microcontroller, a computer, a microprocessor, the computer system of FIG. 1, or any device capable of sending and receiving control signals and data.

As shown in FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by 114*b* and 116*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163).

It will be appreciated that the flow rate of the nebulizer gas can be adjusted (e.g., under the influence of controller 180) such that the flow rate of liquid within the sampling OPI 51 can be adjusted based, for example, on suction/aspiration force generated by the interaction of the nebulizer gas and the analyte-solvent dilution as it is being discharged from the electrospray electrode 164 (e.g., due to the Venturi effect).

As shown in FIG. 1B, the ionization chamber 112 can be maintained at atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114*a* having a curtain plate aperture 114*b*. As shown, a vacuum chamber 116, which houses the mass analyzer 170, is separated from the curtain chamber 114 by a plate 116*a* having a vacuum chamber sampling orifice 116*b*. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions which pass through the analyzer 170 and can, for example, supply a signal indicative of the number of ions per second that are detected.

Mass spectrometers are often coupled with chromatography or other sample introduction systems, such as an ADE device and OPI, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a trace, chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed.

SUMMARY

A system, method, and computer program product are disclosed for calculating the area of a sample peak of a trace produced using high-throughput sample introduction coupled mass spectrometry. The system includes a sample introduction system, a mass spectrometer, and a processor.

The sample introduction system ejects each sample of a series of samples at an ejection time. A series of ejections times corresponding to the series of samples is produced. The sample introduction system also ionizes each ejected sample of the series of samples, producing an ion beam.

The mass spectrometer receives the ion beam and mass analyzes the ion beam over time. A trace of intensity versus time values for one or more mass-to-charge ratio (m/z) values for the series of samples is produced.

The processor receives the trace and the series of ejection times. The processor calculates a series of expected peak times corresponding to the series of ejection times using a known delay time from ejection to mass analysis. The processor identifies at least one isolated peak of the trace using the series of expected peak times. The processor calculates a peak profile by fitting a mixture of at least two different distribution functions to the at least one isolated peak. Finally, for at least one time of the series of the expected peak times, the processor calculates an area of a peak at the one time by fitting the peak profile to the trace at the one time and calculating an area of the fitted peak profile.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

FIG. 6 is an exemplary plot showing detected peaks misaligned with ejection times due to a missing peak and a low-intensity peak.

Figure 1A:
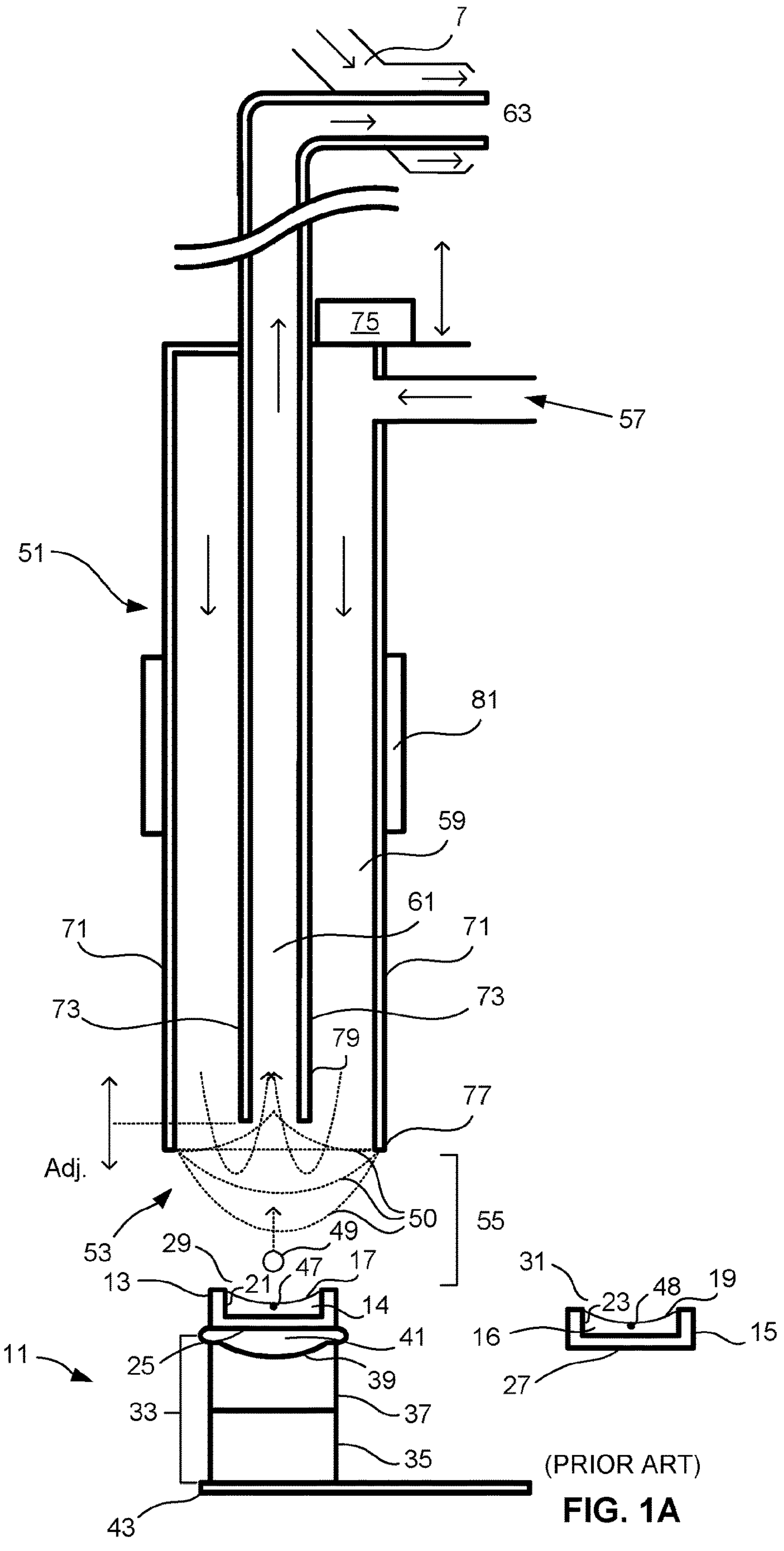
FIG. 1A is an exemplary system combining an acoustic droplet ejection (ADE) with an open port interface (OPI) sampling interface, as described in the '667 Application.
Figure 1B:
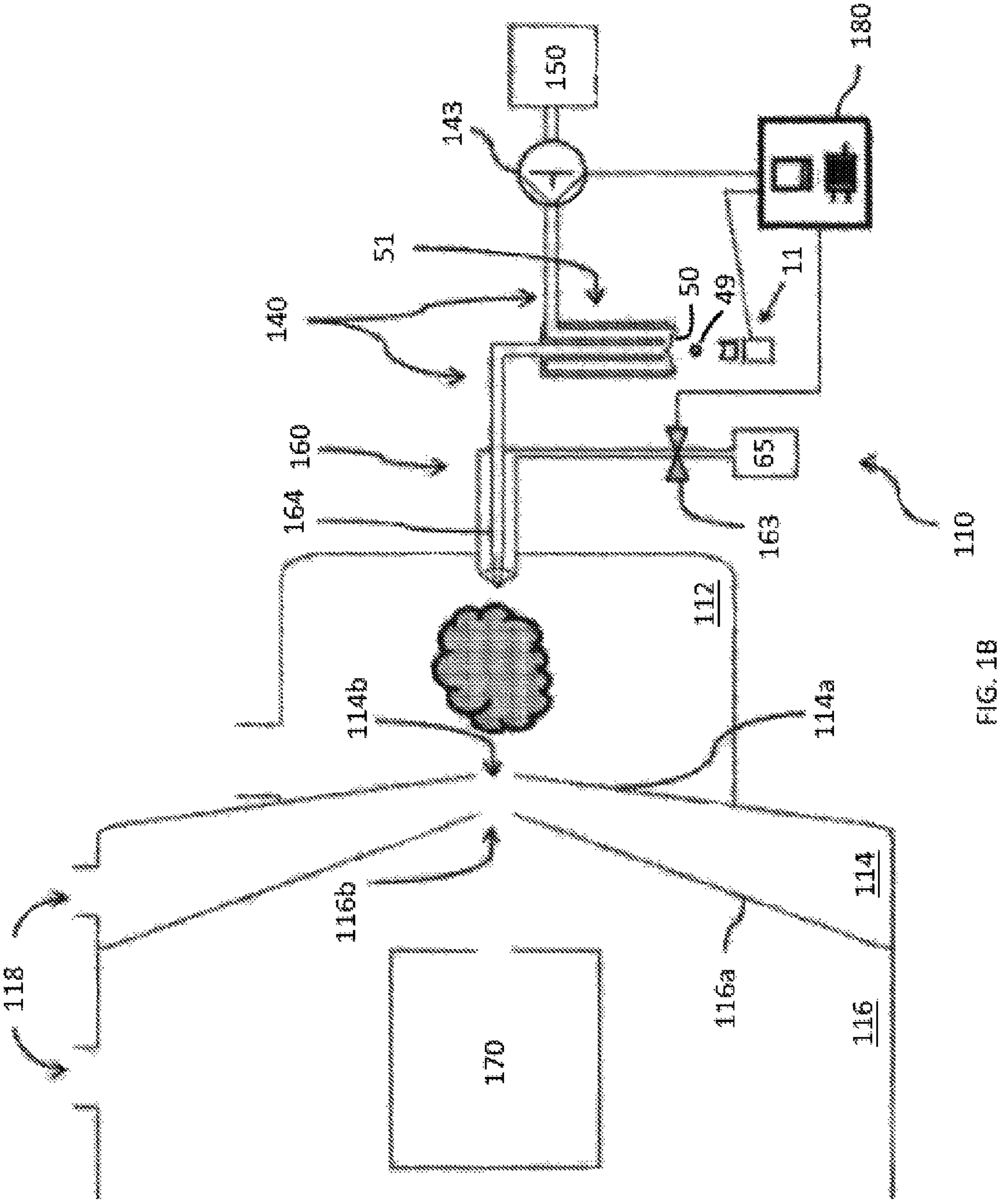
FIG. 1B (PRIOR ART)
FIG. 1B is an exemplary system for ionizing and mass analyzing analytes received within an open end of a sampling OPI, as described in the '667 Application.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 2:
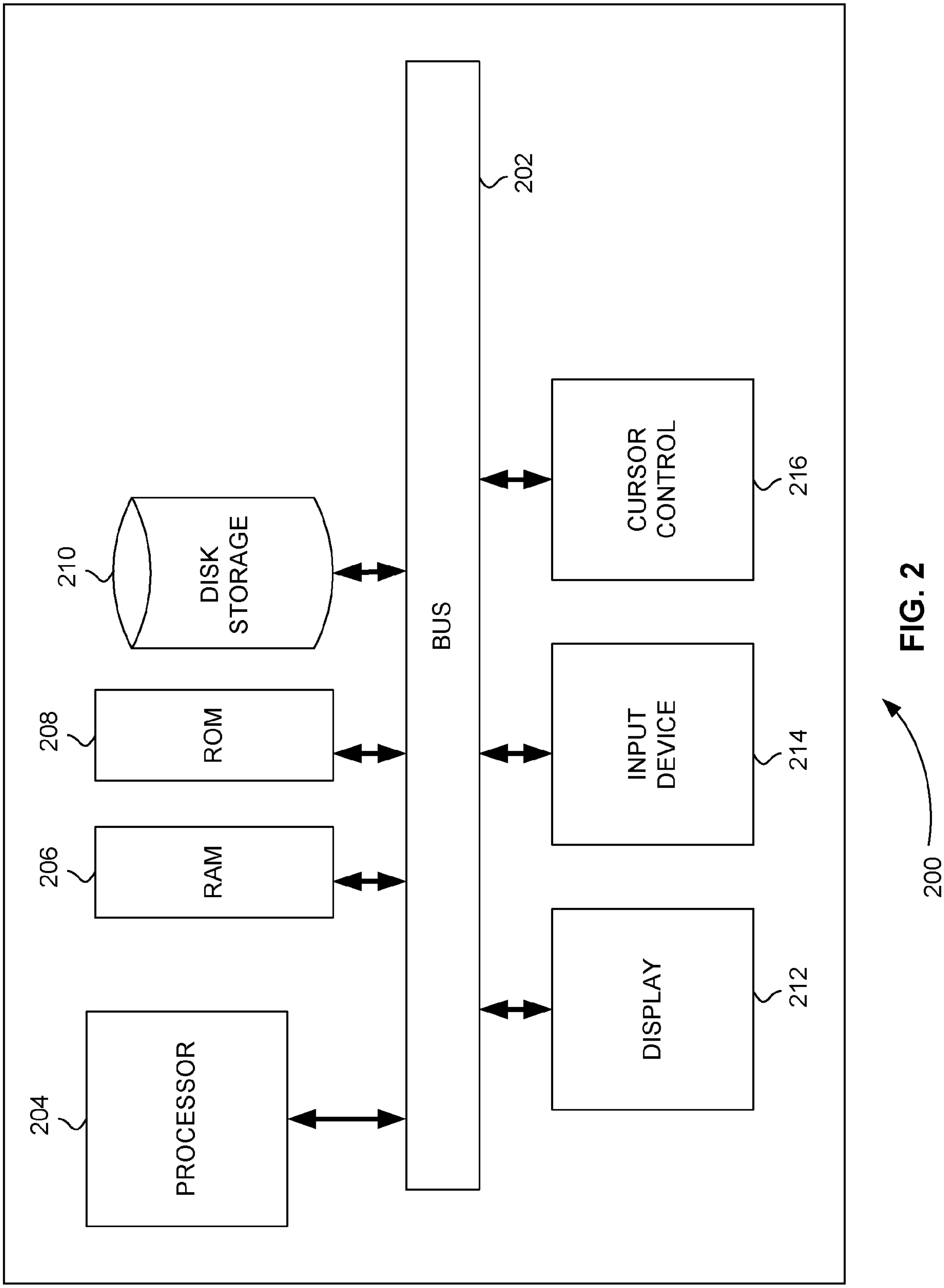
FIG. 2 is a block diagram that illustrates a computer system, upon which embodiments of the present teachings may be implemented.

FIG. 2 is a block diagram that illustrates a computer system 200, upon which embodiments of the present teachings may be implemented. Computer system 200 includes a bus 202 or other communication mechanism for communicating information, and a processor 204 coupled with bus 202 for processing information. Computer system 200 also includes a memory 206, which can be a random-access memory (RAM) or other dynamic storage device, coupled to bus 202 for storing instructions to be executed by processor 204. Memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (i.e., x) and a second axis (i.e., y), that allows the device to specify positions in a plane.

A computer system 200 can perform the present teachings. Consistent with certain implementations of the present teachings, results are provided by computer system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 200 can be connected to one or more other computer systems, like computer system 200, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 204 for execution. For example, the instructions may initially be carried on the magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Calculating Area of High-Throughout Sample Peaks

High-throughput sample analysis is critical to the drug discovery process. Mass spectrometry (MS) based methods can achieve label-free, universal mass detection of a wide range of analytes with exceptional sensitivity, selectivity, and specificity. Recently, a number of sample introduction systems for MS-based analysis have been improved to provide higher throughput.

For some of these technologies, such as acoustic ejection mass spectrometry (AEMS), the sample is delivered to the mass spectrometer quite fast (multiple samples per second). The limiting factor for the throughput, however, is the ability of the data processing algorithm to accurately integrate the area of a peak when signals from adjacent signals are partially overlapped.

Calculating or integrating the peak area of AEMS peaks is especially challenging when a peak of lower intensity immediately follows a peak of much higher signal intensity. Essentially, the lower intensity peak becomes part of or is convolved with the higher intensity peak.

Conventionally, many algorithms are available to integrate interfering chromatographic peaks. Unfortunately, AEMS peaks do not have the same shape as chromatographic peaks. Consequently, the algorithms used to integrate convolved chromatographic peaks cannot be used to integrate AEMS peaks.

Figure 3:
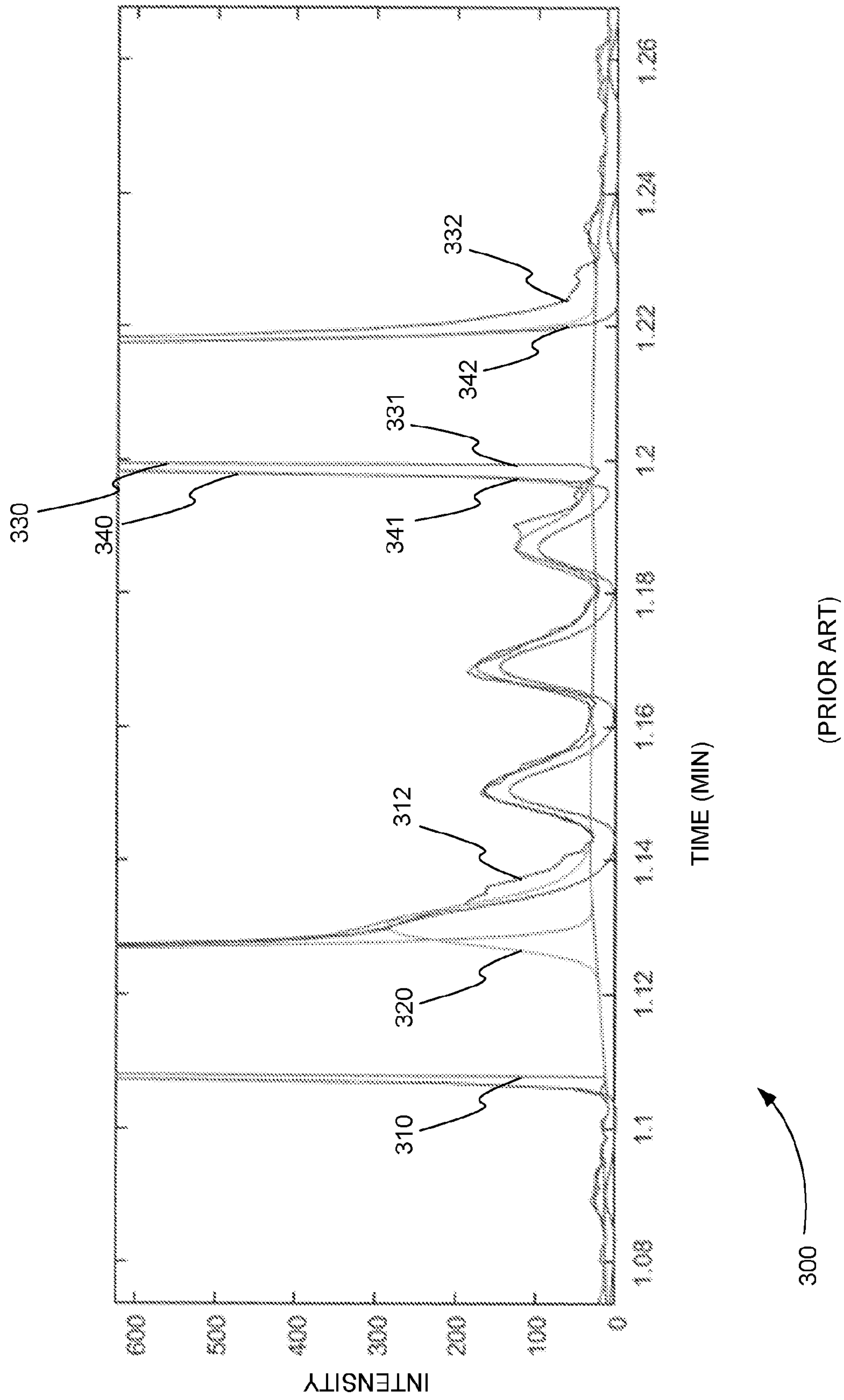
(PRIOR ART) FIG. 3
FIG. 3 is an exemplary plot showing how a mixture of three Gaussian distribution functions of a conventional chromatographic peak integrating algorithm is fitted to peaks of a acoustic ejection mass spectrometry trace.

FIG. 3 is an exemplary plot 300 showing how a mixture of three Gaussian distribution functions of a conventional chromatographic peak integrating algorithm is fitted to peaks of an AEMS trace. Plot 300 shows that the conventional chromatographic peak integrating algorithm has difficultly modeling both convolved and non-convolved AEMS peaks.

For example, first AEMS peak 310 is a convolved peak. A second peak is convolved with peak 310 in trailing edge 312 of peak 310. The conventional chromatographic peak integrating algorithm can detect the convolved peak, sometimes referred to as a shoulder peak.

In order to re-create the second peak, the peak integrating algorithm creates a peak profile or peak profile model. This peak profile is created by fitting a mixture of three Gaussian distribution functions to an isolated peak (not shown) of the AEMS trace. Generally, the most intense isolated peak is used. Once the peak profile is created, it can be used to re-create the second peak.

In plot 300, the peak profile is fitted to the AEMS trace to create modeled second peak 320. A comparison of trailing edge 312 of peak 310 and second peak 320 shows that modeled second peak 320 does not fit trailing edge 312 of peak 310 particularly well. In addition, second peak 320 lacks the asymmetry of an AEMS peak, which is characterized by a larger gradient for the leading edge than for the trailing edge. In other words, second peak 320 is a symmetric peak.

AEMS peak 330 further highlights the difficulty the conventional chromatographic peak integrating algorithm has with non-convolved AEMS peaks. The integrating algorithm creates peak 340 to model actual peak 330. However, leading edge 341 of modeled peak 340 cannot match the faster rising leading edge 331 of actual peak 330. In addition, trailing edge 342 of modeled peak 340 cannot match the longer trailing edge 332 of actual peak 330.

Figure 4:
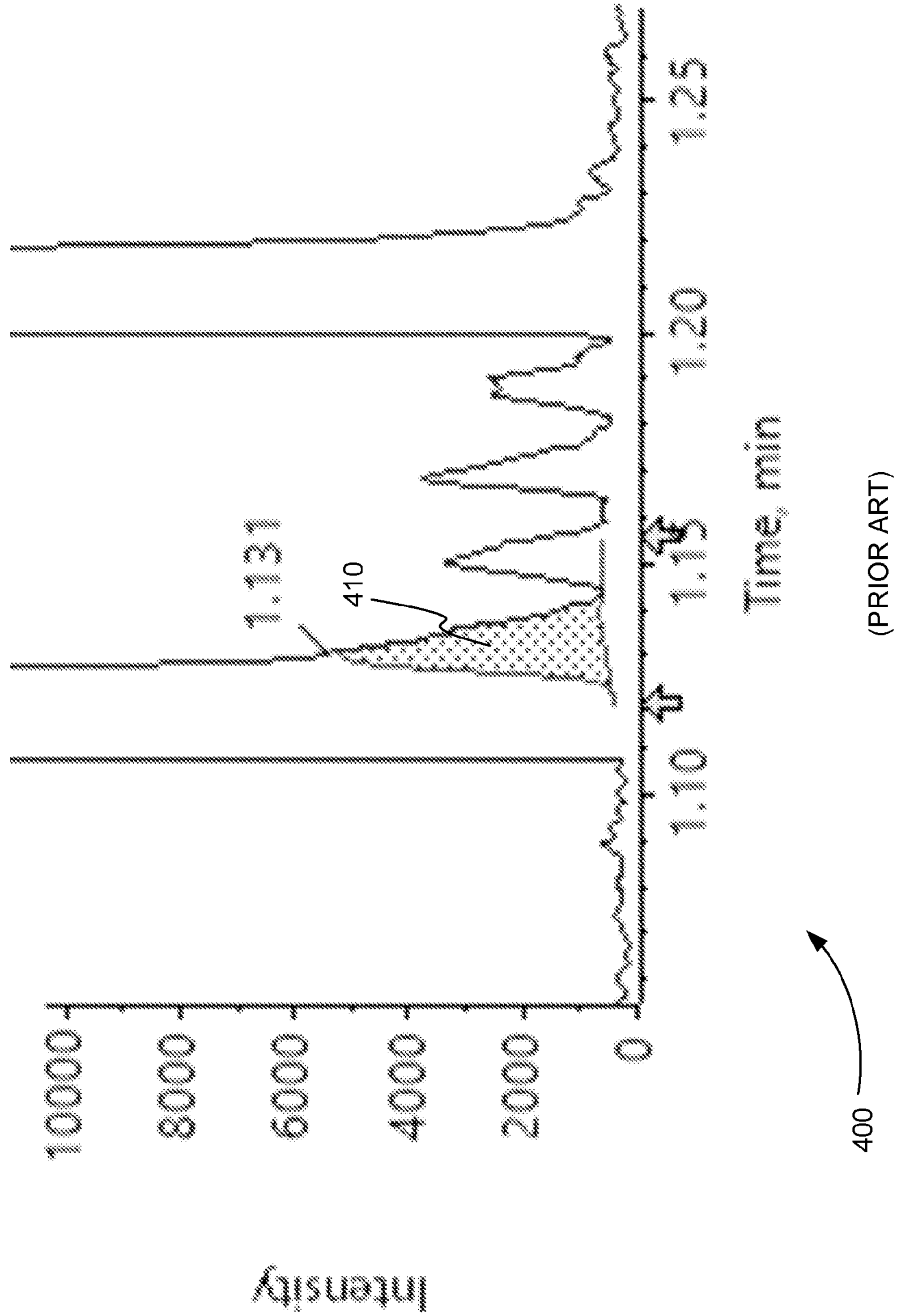
(PRIOR ART) FIG. 4
FIG. 4 is an exemplary plot showing the area calculated for a second convolved peak using the same conventional chromatographic peak integrating algorithm as was used in FIG. 3.

FIG. 4 is an exemplary plot 400 showing the area calculated for a second convolved peak using the same conventional chromatographic peak integrating algorithm as was used in FIG. 3. Plot 400 shows area 410 calculated for a second convolved peak. Area 410 is calculated using a mixture of three Gaussian distribution functions. The retention time found for the second convolved peak is 1.131 min.

In general, any peak shape can be modeled as a mixture of Gaussian distributions. The problem, however, with using increasing numbers of Gaussian distributions is the increasing number of parameters needed. Each Gaussian distribution has a set of parameters. Using multiple Gaussian distributions then requires specifying multiple sets of parameters. Unfortunately, however, an AEMS trace only provides a limited number of points across each peak. For example, it may not be possible to use a mixture of distribution functions that requires more than nine parameters if there are only 20 available points across a peak.

Figure 5:
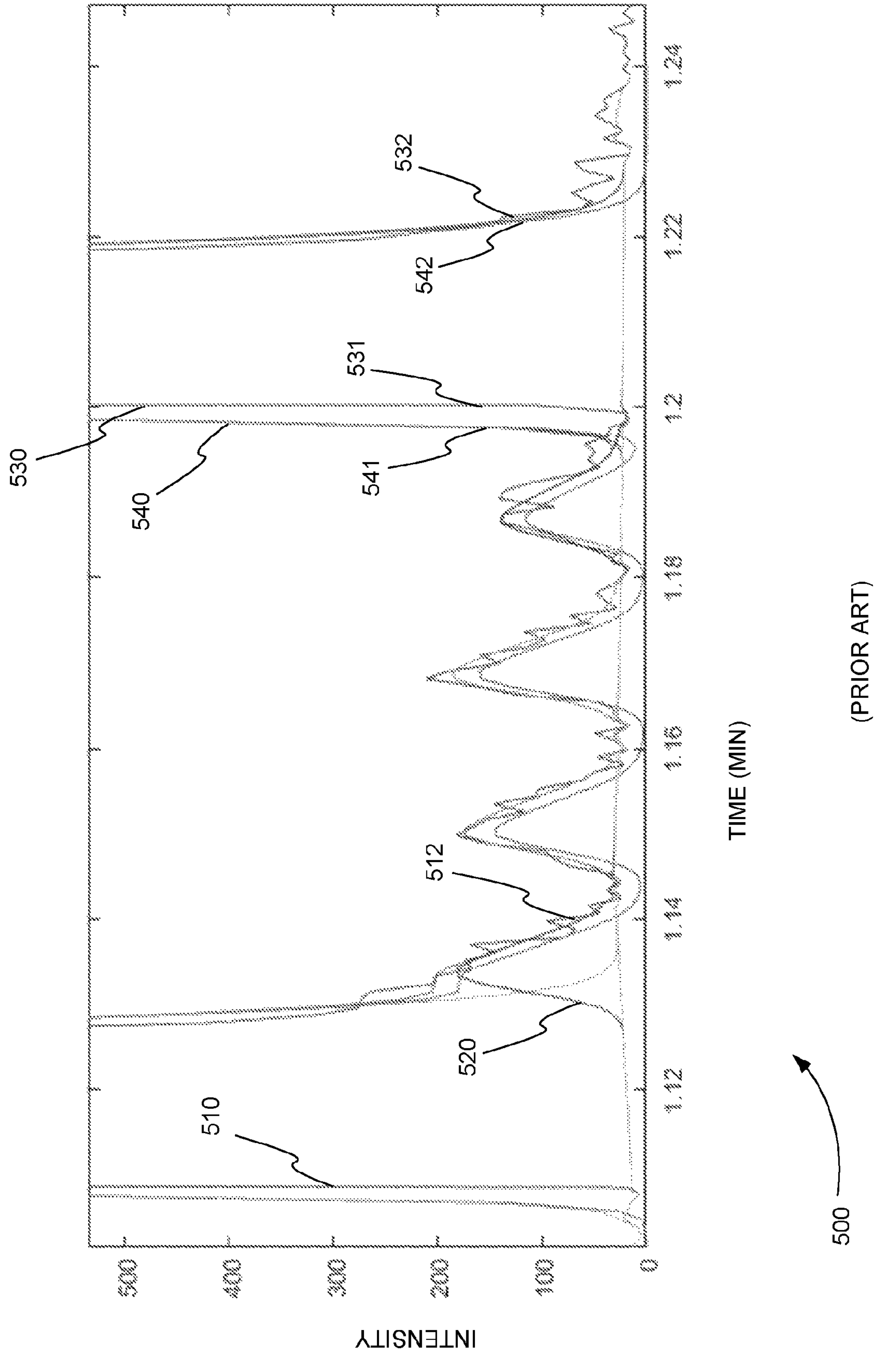
(PRIOR ART) FIG. 5
FIG. 5 is an exemplary plot showing how a mixture of six Gaussian distribution functions of a conventional chromatographic peak integrating algorithm is fitted to peaks of an acoustic ejection mass spectrometry (AEMS) trace.

FIG. 5 is an exemplary plot 500 showing how a mixture of six Gaussian distribution functions of a conventional chromatographic peak integrating algorithm is fitted to peaks of an AEMS trace. Plot 500 shows that increasing the number of Gaussian distribution functions improves the modeling of a convolved peak. However, plot 500, shows that the peak shapes of both convolved and non-convolved AEMS peaks are still not correct.

Again, first AEMS peak 510 is a convolved peak. A second peak is convolved with peak 510 in trailing edge 512 of peak 510. The conventional chromatographic peak integrating algorithm can detect the convolved peak.

In order to re-create the second peak, the peak integrating algorithm creates a peak profile or peak profile model. This peak profile is created by fitting a mixture of six Gaussian distribution functions to an isolated peak (not shown) of the AEMS trace.

In plot 500, the peak profile is fitted to the AEMS trace to create modeled second peak 520. A comparison of trailing edge 512 of peak 510 and second peak 520 shows that modeled second peak 520 fits trailing edge 512 of peak 510 quite well.

However, the shape of modeled second peak 520 is still not correct. The shape lacks the asymmetry of an AEMS peak, which is characterized by a larger gradient for the leading edge than for the trailing edge. In other words, second peak 520 is still a symmetric peak.

AEMS peak 530 further highlights the difficulty the conventional chromatographic peak integrating algorithm has with non-convolved AEMS peaks. The integrating algorithm creates peak 540 to model actual peak 530. By fitting a mixture of six Gaussian distribution functions, trailing edge 542 of modeled peak 540 now matches the longer trailing edge 532 of actual peak 530. However, leading edge 541 of modeled peak 540 still cannot match the more sharply rising leading edge 531 of actual peak 530.

Figure 6:
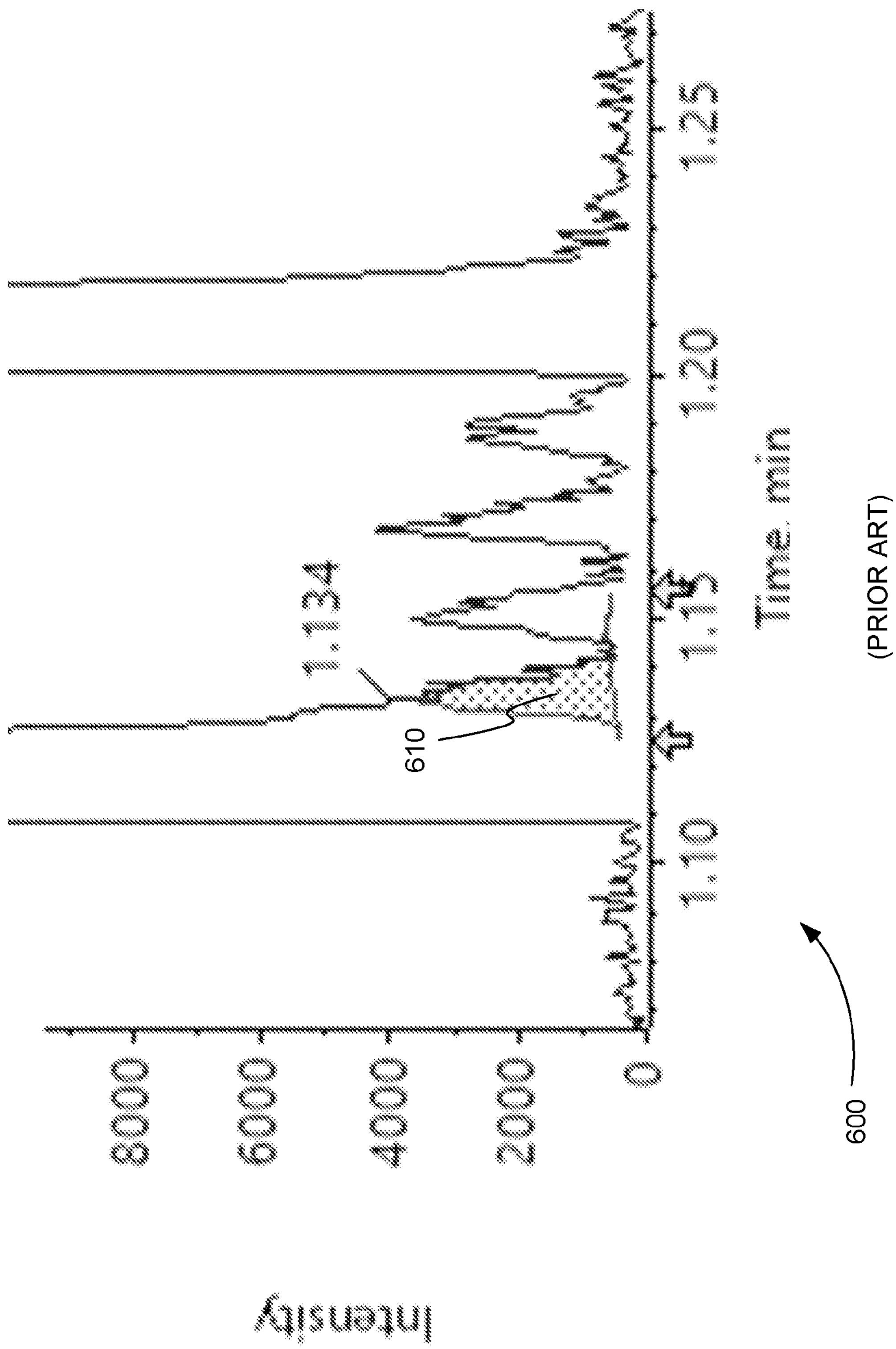
(PRIOR ART) FIG. 6
FIG. 6 is an exemplary plot showing the area calculated for the second convolved peak using the same conventional chromatographic peak integrating algorithm as was used in FIG. 5.

FIG. 6 is an exemplary plot 600 showing the area calculated for the second convolved peak using the same conventional chromatographic peak integrating algorithm as was used in FIG. 5. Plot 600 shows area 610 calculated for the second convolved peak. Area 610 is calculated using a mixture of six Gaussian distribution functions. The retention time found for the second convolved peak is now 1.134 min. In comparison to FIG. 4, FIG. 6 shows that the area calculation is improved by using a mixture of six Gaussian distribution functions. In other words, area 610 of the convolved peak is more similar to the areas of the other peaks in FIG. 6 than the area of the convolved peak in FIG. 4.

However, FIGS. 3-6 show that, in general, that the algorithms used to integrate convolved chromatographic peaks cannot be used to integrate AEMS peaks. As a result, additional systems and methods are needed to calculate or integrate the area of AEMS peaks.

In various embodiments, AEMS peak area calculation or integration is improved by using the ejection timing data provided by the (ADE) device. Expected AEMS peak times corresponding to the ADE ejection times are calculated using a known delay time from the ejection of a sample to its mass analysis. These expected AEMS peak times are then used by the AEMS peak integrating algorithm to fit the peak profile to the AEMS trace.

No conventional chromatographic peak integrating algorithm has used sample ejection times because the delay time through a chromatographic column is dependent on the particular sample being analyzed. In other words, the elution of samples through a chromatographic column can vary widely.

Also, in various embodiments, AEMS peak area calculation or integration is improved by using at least two different distribution functions. As should be understood, two different distribution functions can include the use of two functions of the same type such as a Guassin function, but containing different parameters. As described above, using multiple distributions of the same type of distribution function can require more parameters to adjust. Using at least two different distribution functions of different type, however, can provide the peak shape asymmetry using fewer parameters.

In general, an AEMS peak has a stable shape. An AEMS peak has a small peak width variation and a consistent delay with respect to the known ejection or injection time. The coefficient of variation (CV) for the area of an AEMS peak is 3-8%.

In various embodiments, an AEMS peak is first modeled using a peak profile. The AEMS peak profile has an analytical curve or shape able to handle strong rising and long tailing signals. The peak profile is able to handle first derivative singularity points in a numerical optimization. The peak profile is created from an optimum mixture model that deviates from a Gaussian distribution by including at least one additional distribution function.

The peak profile is then fitted to the AEMS trace using the ADE ejection times as input to constrain the optimization. The ADE ejection times can also be used to create the peak profile. They can be used to identify an isolated AEMS peak from which the peak profile is created.

Figure 7:
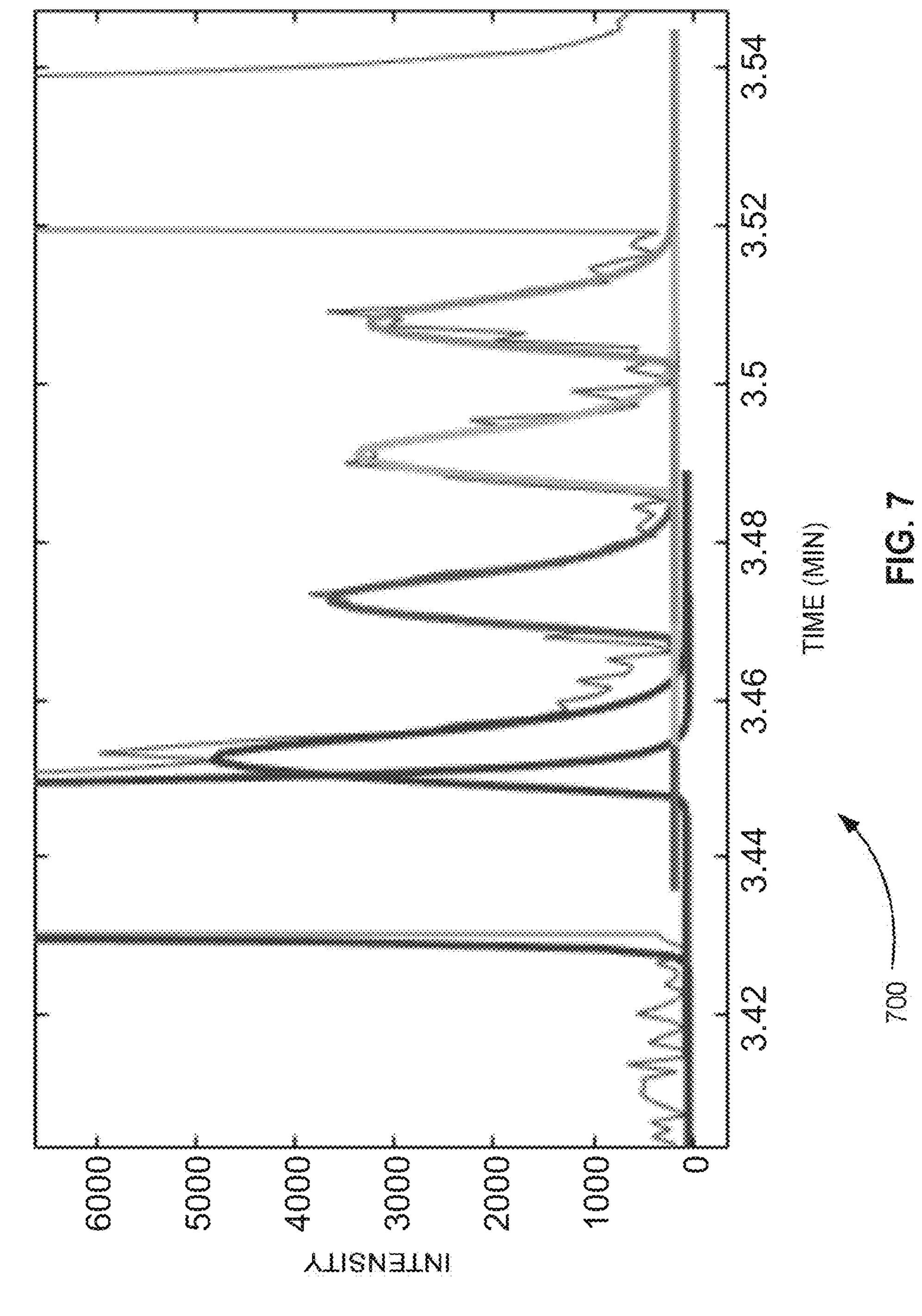
FIG. 7 is an exemplary plot showing how an AEMS peak area calculation is improved by using the ejection timing data and using at least two different distribution functions, in accordance with various embodiments.

FIG. 7 is an exemplary plot 700 showing how an AEMS peak area calculation is improved by using the ejection timing data and using at least two different distribution functions, in accordance with various embodiments. In plot 700, first AEMS peak 710 is a convolved peak. A second peak is convolved with peak 710 in trailing edge 712 of peak 710.

In order to re-create the second peak, the AEMS peak integrating algorithm creates a peak profile or peak profile model. This peak profile is created by fitting a mixture of a Gaussian distribution function and a Weibull distribution function to an isolated peak (not shown) of the AEMS trace.

In plot 700, the peak profile is fitted to the AEMS trace to create modeled second peak 720. This fitting now uses the known ejection time of the sample producing the second peak. In other words, from the known ejection of the sample producing the second peak, the expected time of the second peak is calculated. The expected time of the second peak is then used to fit the peak profile to the AEMS trace. Modeled second peak 720 is now well fitted to trailing edge 712 of peak 710.

In related embodiments, it also possible to adjust individual peak times using constrain time-parameter optimization. In such embodiments, the optimization of the peak position can be performed since it's positions is known with a certain precision as there is some randomness in the variation of exact elution time with respect to injection timing (a parameter that is specifically known)

Figure is not created by constrained optimization but it could be in general

To me, this is not saying that we fit just intensities (stretching peak profile that we place at the predetermined time position)

But it seas that we fit profile, meaning we fit all profile parameters, meaning intensity and position, but we use predetermine time in that fitting operation In addition, due to using a Gaussian distribution function and a Weibull distribution function, second peak 720 now has the correct AEMS peak shape. Specifically, second peak 720 now includes a larger gradient for the leading edge than for the trailing edge. Second peak 720 is now an asymmetric peak.

Modeled peak 730 for actual AEMS peak 710 is also improved. The leading edge of modeled peak 730 still includes only a slight deviation from the leading edge of actual peak 710. In addition, this deviation can be compensated for by adjusting the parameters of modeled peak 730.

The peak area calculation or integration shown in FIG. 7 is not limited to peaks produced by AEMS. This peak integration can be performed on sample peaks produced by any sample introduction system coupled to a mass spectrometer that produces asymmetric sample mass peaks, records the sample ejection times of the ejections performed by the sample introduction system, and has a consistent delay time from ejection to mass analysis.

System for Calculating the Area of a Sample Peak

Figure 8:
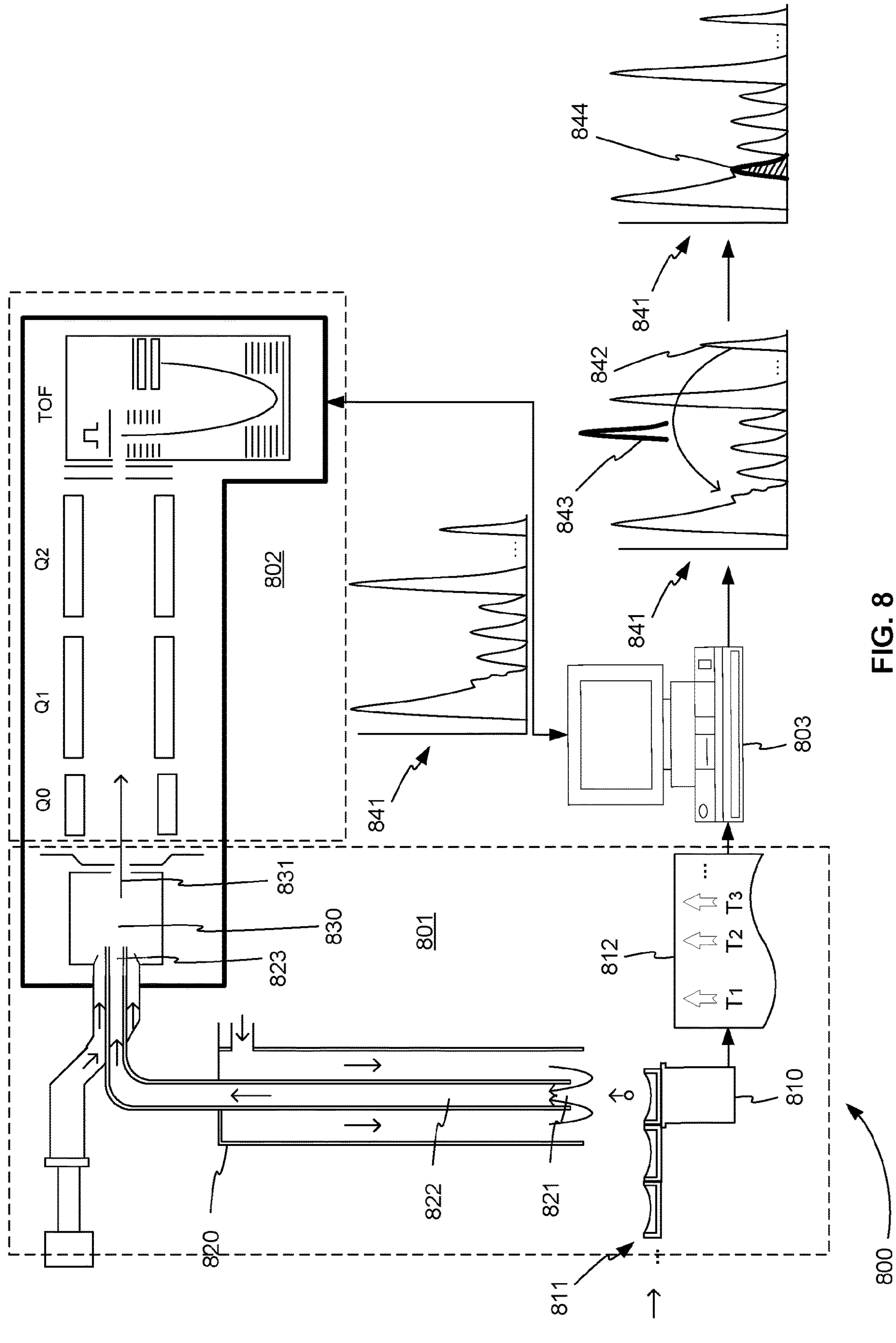
FIG. 8 is a schematic diagram of a system for calculating the area of a sample peak of a trace produced using high-throughput sample introduction coupled mass spectrometry, in accordance with various embodiments.

FIG. 8 is a schematic diagram 800 of a system for calculating the area of a sample peak of a trace produced using high-throughput sample introduction coupled mass spectrometry, in accordance with various embodiments. The system of FIG. 8 includes sample introduction system 801, mass spectrometer 802, and processor 803.

Sample introduction system 801 ejects each sample of a series of samples 811 at an ejection time. A series of ejections times 812 corresponding to series of samples 811 is produced. Sample introduction system 801 also ionizes each ejected sample of series of samples 811, producing an ion beam 831.

Mass spectrometer 802 receives ion beam 831 and mass analyzes ion beam 831 over time. A trace 841 of intensity versus time values for one or more m/z values for series of samples 811 is produced.

Processor 803 receives trace 841 and series of ejection times 812. Processor 803 calculates a series of expected peak times corresponding to series of ejection times 812 using a known delay time from ejection to mass analysis. Processor 803 identifies at least one isolated peak 842 of trace 841 using the series of expected peak times. Processor 803 calculates a peak profile 843 by fitting a mixture of at least two different distribution functions to at least one isolated peak 842. Finally, for at least one time of the series of the expected peak times, processor 803 calculates an area of a peak at the one time by fitting peak profile 843 to trace 841 at the one time and calculating an area of fitted peak profile 844.

FIG. 8 shows the calculation of an area for only one peak of trace 841. In various embodiments, the area is calculated for two or more peaks or for all peaks of trace 841.

In various embodiments, processor 803 identifies at least one isolated peak 842 of trace 841 using the series of expected peak times by using the series of expected peak times to determine if there is overlap between peaks. Specifically, processor 803 identifies one or more peaks that have a minimum overlap with adjacent peaks. This is done, for example, by calculating intensities at midpoints between peaks using the series of expected peak times. Then each peak that has an intensity at each midpoint with an adjacent peak that is less than a threshold intensity value is selected. Finally, a peak of the one or more peaks that has a minimum overlap and that has the highest intensity is selected as at least one isolated peak 842.

In various embodiments, expected peak times are for a peak apex. Specifically, each time of the series of expected peak times includes a time at which an apex of a peak is expected.

In various embodiments, the mixture of at least two different distribution functions is used to model an asymmetric peak. Specifically, the mixture of at least two different distribution functions produces an asymmetric peak that has a larger leading edge gradient than a trailing edge gradient.

In various embodiments, the at least two different distribution functions comprise a Gaussian distribution function. In various embodiments, the at least two different distribution functions comprise a Weibull distribution function.

In various embodiments, sample introduction system 801 includes a surface analysis system. In various embodiments, the surface analysis system can be, but is not limited to, a matrix-assisted laser desorption/ionization (MALDI) device or a laser diode thermal desorption (LDTD) device.

In various embodiments, sample introduction system 801 includes a flow injection device and an ion source device. For example, the flow injection device can be a timed valve device that injects sample into a flowing stream through a valve at each ejection time of series of ejection times 812 and the ion source device ionizes samples of the flowing stream, producing ion beam 831.

In various embodiments, the flow injection device can be a droplet dispenser that ejects series of samples 811 as droplets into a flowing stream at each ejection time of the series of ejection times and the ion source device ionizes samples of the flowing stream, producing ion beam 831.

In various embodiments, and as shown in FIG. 8, the droplet dispenser includes ADE device 810 that ejects series of samples 811 as droplets into inlet 821 of tube 822 of OPI 820. OPI 820 OPI mixes the droplets of series of samples 811 with a solvent in tube 822 to form a series of analyte-solvent dilutions. OPI 820 transfers the series of dilutions to outlet 823 of tube 822 of OPI 820. Ion source device 830 receives the series of dilutions and ionizes samples of the series of dilutions as they are received, producing ion beam 831 that varies as the dilutions are delivered. Ion source device 830 can be an electrospray ion source (ESI) device, for example. Ion source device 830 is shown as part of mass spectrometer 802 in FIG. 8 but can be a separate device also.

Mass spectrometer 802 can perform MS or MS/MS. Mass spectrometer 802 can be any type of mass spectrometer. Mass spectrometer 802 is shown as including a time-of-flight (TOF) mass analyzer, but mass spectrometer 802 can include any type of mass analyzer, including a triple quadrupole mass analyzer.

In various embodiments, processor 803 is used to send and receive instructions, control signals, and data to and from sample introduction system 801 and mass spectrometer 802. Processor 803 controls or provides instructions by, for example, controlling one or more voltage, current, or pressure sources (not shown). Processor 803 can be a separate device as shown in FIG. 12 or can be a processor or controller of sample introduction system 801 or mass spectrometer 802. Processor 803 can be, but is not limited to, a controller, a computer, a microprocessor, the computer system of FIG. 2, or any device capable of sending and receiving control signals and data and analyzing data.

Note that terms "eject," "ejection," "ejection times," and the like are used throughout this written description in reference to a sample introduction system. One of ordinary skill in the art can appreciate that other terms can also be used to describe the movement of sample from the sample introduction system, such as, but not limited to, terms like "inject," "injection," and "injection times."

Method for Calculating the Area of a Sample Peak

Figure 9:
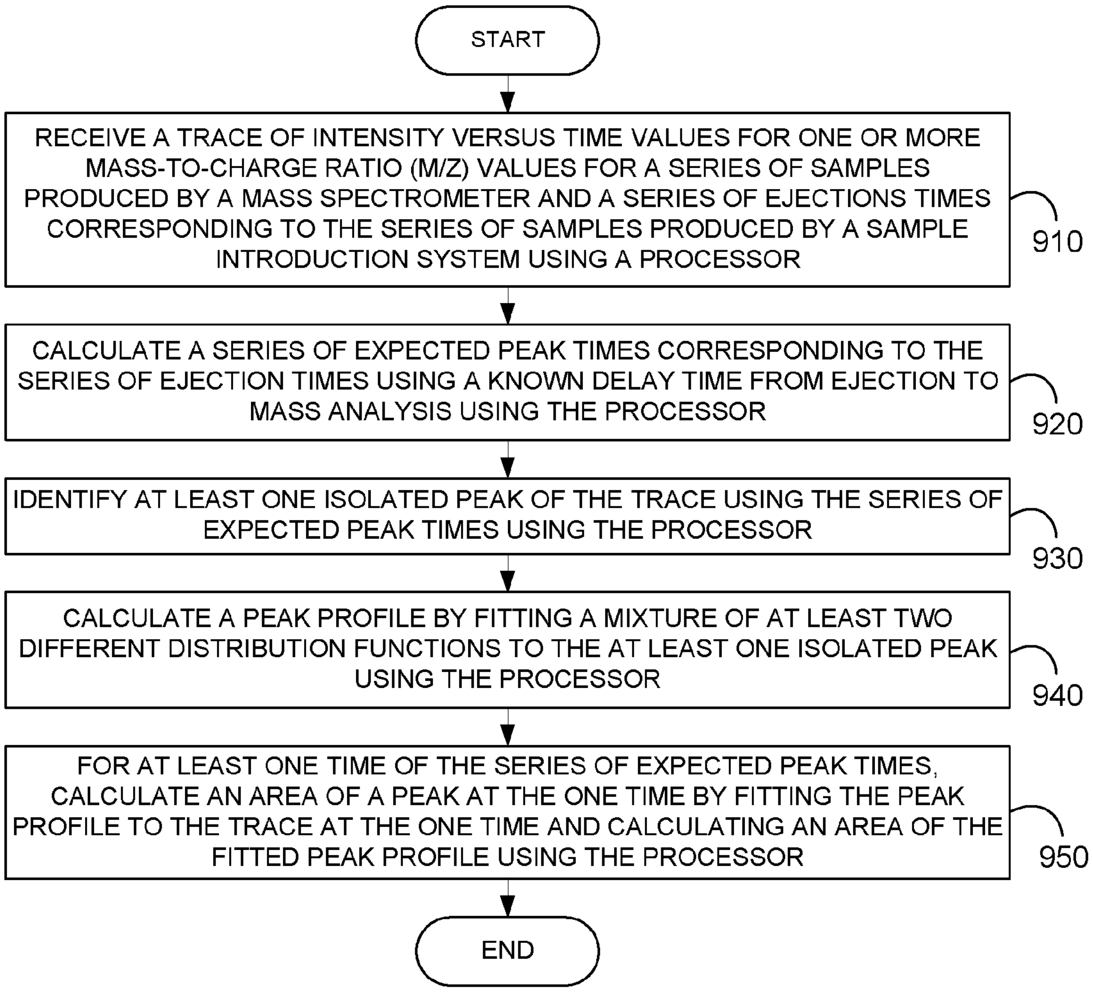
FIG. 9 is a flowchart showing a method for calculating the area of a sample peak of a trace produced using high-throughput sample introduction coupled mass spectrometry, in accordance with various embodiments.

FIG. 9 is a flowchart showing a method 900 for calculating the area of a sample peak of a trace produced using high-throughput sample introduction coupled mass spectrometry, in accordance with various embodiments.

In step 910 of method 900, a trace of intensity versus time values for one or more m/z values is received for a series of samples produced by a mass spectrometer using a processor. Also, a series of ejections times corresponding to the series of samples produced by a sample introduction system is received using a processor.

In step 920, a series of expected peak times corresponding to the series of ejection times are calculated using a known delay time from ejection to mass analysis using the processor.

In step 930, at least one isolated peak of the trace is identified using the series of expected peak times using the processor.

In step 940, a peak profile is calculated by fitting a mixture of at least two different distribution functions to the at least one isolated peak using the processor.

In step 950, for at least one time of the series of expected peak times, an area of a peak at the one time is calculated by fitting the peak profile to the trace at the one time and calculating an area of the fitted peak profile using the processor.

Computer Program Product for Calculating the Area of a Sample Peak

In various embodiments, computer program products include a tangible computer-readable storage medium whose contents include a program with instructions being executed on a processor so as to perform a method for calculating the area of a sample peak of a trace produced using high-throughput sample introduction coupled mass spectrometry. This method is performed by a system that includes one or more distinct software modules.

Figure 10:
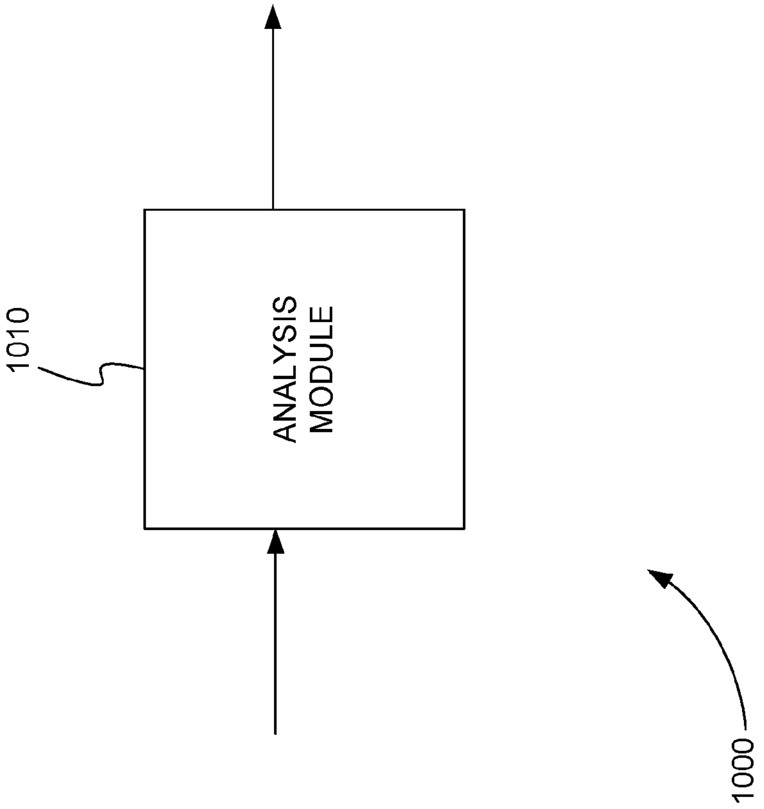
FIG. 10 is a schematic diagram of a system that includes one or more distinct software modules that performs a method for calculating the area of a sample peak of a trace produced using high-throughput sample introduction coupled mass spectrometry, in accordance with various embodiments.

FIG. 10 is a schematic diagram of a system 1000 that includes one or more distinct software modules that perform a method for calculating the area of a sample peak of a trace produced using high-throughput sample introduction coupled mass spectrometry, in accordance with various embodiments. System 1000 includes analysis module 1010.

Analysis module 1010 receives a trace of intensity versus time values for one or more m/z values for a series of samples produced by a mass spectrometer. Analysis module 1010 also receives a series of ejections times corresponding to the series of samples produced by a sample introduction system.

Analysis module 1010 calculates series of expected peak times corresponding to the series of ejection times using a known delay time from ejection to mass analysis. Analysis module 1010 identifies at least one isolated peak of the trace using the series of expected peak times.

Analysis module 1010 calculates a peak profile by fitting a mixture of at least two different distribution functions to the at least one isolated peak. Finally, for at least one time of the series of expected peak times, analysis module 1010 calculates an area of a peak at the one time by fitting the peak profile to the trace at the one time and calculating an area of the fitted peak profile.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calculating an area of a sample peak of a trace produced using high-throughput sample introduction coupled mass spectrometry, comprising:

a sample introduction system that ejects each sample of a series of samples at an ejection time, producing a series of ejections times corresponding to the series of samples, and ionizes each ejected sample of the series of samples, producing an ion beam;

a mass spectrometer that receives the ion beam and mass analyzes the ion beam over time, producing a trace of intensity versus time values for one or more mass-to-charge ratio (m/z) values for the series of samples; and a processor that receives the trace and the series of ejection times, calculates a series of expected peak times corresponding to the series of ejection times using a known delay time from ejection to mass analysis, identifies at least one isolated peak of the trace using the series of expected peak times, calculates a peak profile by fitting a mixture of at least two different distribution functions to the at least one isolated peak, and for at least one time of the series of expected peak times, calculates an area of a peak at the at least one time by fitting the peak profile to the trace at the one time and calculating an area of the fitted peak profile.

2. The system of claim 1, wherein the processor identifies at least one isolated peak of the trace using the series of expected peak times by:

identifying one or more peaks that has a minimum overlap with adjacent peaks by calculating intensities at midpoints between peaks using the series of expected peak times and selecting each peak that has an intensity at each midpoint with an adjacent peak that is less than a threshold intensity value, and identifying a peak of the one or more peaks that has a minimum overlap and that has a highest intensity as the at least one isolated peak.

3. The system of claim 1, wherein the at least two different distribution functions comprise a Gaussian distribution function.

4. The system of claim 1, wherein the at least two different distribution functions comprise a Weibull distribution function.

5. The system of claim 1, wherein the sample introduction system comprises a surface analysis system.

6. The system of claim 5, wherein the surface analysis system comprises a matrix-assisted laser desorption/ionization (MALDI) device.

7. The system of claim 5, wherein the surface analysis system comprises a laser diode thermal desorption (LDTD) device.

8. The system of claim 1, wherein the sample introduction system comprises a flow injection device and an ion source device.

9. The system of claim 8, wherein the flow injection device comprises a timed valve device that injects sample into a flowing stream through a valve at each ejection time of the series of ejection times and wherein the ion source device ionizes samples of the flowing stream, producing the ion beam.

10. The system of claim 8, wherein the flow injection device comprises a droplet dispenser that ejects the series of samples as droplets into a flowing stream at each ejection time of the series of ejection times and wherein the ion source device ionizes samples of the flowing stream, producing the ion beam.

11. The system of claim 10, wherein the droplet dispenser comprises an acoustic droplet ejection (ADE) device that ejects the series of samples as droplets into an inlet of a tube of an open port interface (OPI), wherein the OPI mixes the droplets of the series of samples with a solvent in the tube to form a series of analyte-solvent dilutions and transfers the series of analyte-solvent dilutions to an outlet of the tube of the OPI, and wherein the ion source device receives the series of dilutions and ionizes samples of the series of dilutions, producing the ion beam.

12. The system of claim 1, wherein each time of the series of expected peak times comprises a time at which an apex of a peak is expected.

13. The system of claim 1, wherein the mixture of at least two different distribution functions produces an asymmetric peak that has a larger leading edge gradient than a trailing edge gradient.

14. A method for calculating the area of a sample peak of a trace produced using high-throughput sample introduction coupled mass spectrometry, comprising:

receiving a trace of intensity versus time values for one or more mass-to-charge ratio (m/z) values for a series of samples produced by a mass spectrometer and a series of ejections times corresponding to the series of samples produced by a sample introduction system using a processor;

calculating a series of expected peak times corresponding to the series of ejection times using a known delay time from ejection to mass analysis using the processor;

identifying at least one isolated peak of the trace using the series of expected peak times using the processor;

calculating a peak profile by fitting a mixture of at least two different distribution functions to the at least one isolated peak using the processor; and for at least one time of the series of expected peak times, calculating an area of a peak at the one time by fitting the peak profile to the trace at the one time and calculating an area of the fitted peak profile using the processor.

15. A computer program product, comprising a non-transitory and tangible computer-readable storage medium whose contents include a program with instructions being executed on a processor so as to perform a method for calculating the area of a sample peak of a trace produced using high-throughput sample introduction coupled mass spectrometry, the method comprising:

providing a system, wherein the system comprises one or more distinct software modules, and wherein the one or more distinct software modules comprise an analysis module;

receiving a trace of intensity versus time values for one or more mass-to-charge ratio (m/z) values for a series of samples produced by a mass spectrometer and a series of ejections times corresponding to the series of samples produced by a sample introduction system using the analysis module;

calculating a series of expected peak times corresponding to the series of ejection times using a known delay time from ejection to mass analysis using the analysis module;

identifying at least one isolated peak of the trace using the series of expected peak times using the analysis module;

calculating a peak profile by fitting a mixture of at least two different distribution functions to the at least one isolated peak using the analysis module; and for at least one time of the series of expected peak times, calculating an area of a peak at the one time by fitting the peak profile to the trace at the one time and calculating an area of the fitted peak profile using the analysis module.

* * * * *